US011077540B1

(12) United States Patent
Dewitt

(10) Patent No.: US 11,077,540 B1
(45) Date of Patent: Aug. 3, 2021

(54) PACK JACK SYSTEM

(71) Applicant: Jeremy Dewitt, Lakeland, FL (US)

(72) Inventor: Jeremy Dewitt, Lakeland, FL (US)

( * ) Notice: Subject to any disclaimer, the term of this patent is extended or adjusted under 35 U.S.C. 154(b) by 235 days.

(21) Appl. No.: 16/520,976

(22) Filed: Jul. 24, 2019

Related U.S. Application Data

(60) Provisional application No. 62/703,311, filed on Jul. 25, 2018.

(51) Int. Cl.
*B23P 11/00* (2006.01)
*B25B 27/00* (2006.01)

(52) U.S. Cl.
CPC ................................ *B25B 27/0028* (2013.01)

(58) Field of Classification Search
CPC .............................. B25B 27/0028; B25D 1/16
See application file for complete search history.

(56) References Cited

U.S. PATENT DOCUMENTS 118,823 A * 9/1871 Smade ................ B25B 27/0028 81/8.1
6,035,946 A * 3/2000 Studley .................. A62B 3/005 173/128
7,752,944 B2 * 7/2010 Wallek .................... B25B 27/02 81/27

* cited by examiner

*Primary Examiner* — Lee D Wilson
*Assistant Examiner* — Donna Maynard
(74) *Attorney, Agent, or Firm* — Lewellyn Law, PLLC; Stephen Lewellyn

(57) ABSTRACT

A shaft assembly has a central rod, a braided cable, and a coupling there between. The coupling receives the lower end of the central rod and the upper end of the braided cable. A fastener has an upper end with a cylindrical extension for coupling with the lower end of the braided cable. A handle has an upper region with a cylindrical extension and a lower region with a cylindrical flange with a left tab and a right tab. A slide hammer is configured to be vertically reciprocable along the shaft assembly. The slide hammer has an upper region with an upper cylindrical flange. The slide hammer has a lower region with a lower cylindrical flange with a lower extension.

8 Claims, 3 Drawing Sheets

PACK JACK SYSTEM

RELATED APPLICATION

The present application is based upon Provisional Patent Application No. 62/703,331 entitled "Pack Jack System" filed Jul. 25, 2018, the priority of which is claimed and the subject matter of which is incorporated herein by reference.

BACKGROUND OF THE INVENTION

Field of the Invention

The present invention relates to a pack jack system and more particularly pertains to facilitating the extraction of gland packing and gasket rings to abate injuries when extracting gland packing and gasket rings. The facilitating of extraction and the abating of injuries is done in a safe, comfortable, convenient, and economical manner.

Description of the Prior Art

The use of packing removal devices is known in the prior art. More specifically, flexible packing removal devices previously devised and utilized for the purpose of using a corkscrew to extract gland packing, gasket rings, and other types of seals are known to consist basically of familiar, expected, and obvious structural configurations, notwithstanding the myriad of designs encompassed by the crowded prior art which has been developed for the fulfillment of countless objectives and requirements.

While known devices fulfill their respective, particular objectives and requirements, they do not describe a pack jack system that facilitates the extraction of gland packing and gasket rings to abate injuries where the facilitating of extraction and the abating injuries is done in a safe, comfortable, convenient, and economical manner.

In this respect, the pack jack system according to the present invention substantially departs from the conventional concepts and designs of the prior art, and in doing so provides an apparatus primarily developed for the purpose of facilitating the extraction of gland packing and gasket rings for abating injuries. The facilitating of extraction and the abating injuries is done in a safe, comfortable, convenient, and economical manner.

Therefore, it can be appreciated that there exists a continuing need for a new and improved pack jack system which can be used for facilitating the extraction of gland packing and gasket rings and for abating injuries. In this regard, the present invention substantially fulfills this need.

SUMMARY OF THE INVENTION

In view of the disadvantages inherent in the known types of packing removal devices of known designs and configurations now present in the prior art, the present invention provides an improved pack jack system. As such, the general purpose of the present invention, which will be described subsequently in greater detail, is to provide a new and improved pack jack system and method which has all the advantages of the prior art and none of the disadvantages.

To attain this, from a broad perspective, the present invention essentially comprises a pack jack system. First provided is a shaft assembly having a central rod, a braided cable, and a coupling between the central rod and the braided cable. The central rod has an upper end and a lower end. The braided cable has an upper end and a lower end. The coupling receives the lower end of the central rod and the upper end of the braided cable.

Next, a fastener is provided. The fastener has an upper end and a lower end. The upper end has a cylindrical extension for coupling with the lower end of the braided cable.

A handle is provided next. The handle has an upper region and a lower region. The upper region has a cylindrical extension. The lower region has a cylindrical flange with a left tab and a right tab.

Lastly provided is a slide hammer configured to be vertically reciprocable along the shaft assembly. The slide hammer has an upper region with an upper cylindrical flange. The slide hammer has a lower cylindrical region with a lower cylindrical flange. The lower cylindrical flange has a lower extension.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pack jack system which has all of the advantages of the prior art flexible packing removal devices of known designs and configurations and none of the disadvantages.

It is another object of the present invention to provide a new and improved pack jack system which may be easily and efficiently manufactured and marketed.

It is a further object of the present invention to provide a new and improved pack jack system which is of durable and reliable constructions.

An even further object of the present invention is to provide a new and improved pack jack system which is susceptible of a low cost of manufacture with regard to both materials and labor, and which accordingly is then susceptible of low prices of sale to the consuming public, thereby making such pack jack system economically available to the buying public.

Lastly, it is an object of the present invention to provide a pack jack system for using a corkscrew or other fastener to extract gland packing, gasket rings, and other types of seals.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
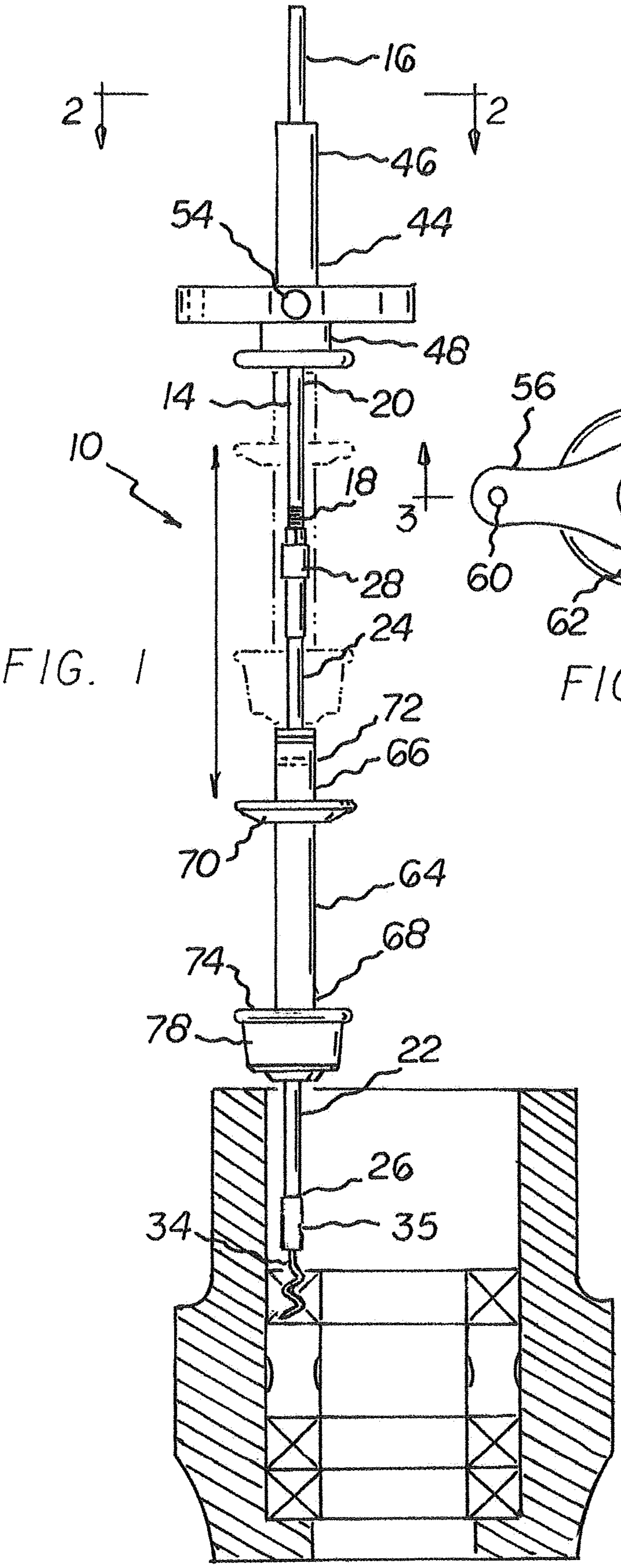
FIG. 1 is front elevational view of the pack jack system constructed in accordance with the principles of the present invention.
Figure 2:
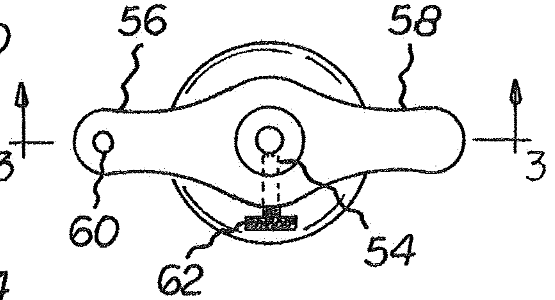
FIG. 2 is a cross sectional view taken along line 2-2 of FIG. 1.

With reference now to the drawings, and in particular to FIG. 1 thereof, the preferred embodiment of the new and improved pack jack system embodying the principles and concepts of the present invention and generally designated by the reference numeral 10 will be described.

The present invention, the pack jack system 10 is comprised of a plurality of components. Such components in their broadest context include a shaft assembly, a fastener, a handle, and a slide hammer. Such components are individually configured and correlated with respect to each other so as to attain the desired objective.

From a specific perspective, the invention of the present application is a pack jack system 10 for removing gland packing and gasket seals from a variety of pipes, pumps, pump housings and other like systems. In the primary embodiment, first provided is a shaft assembly. The shank assembly includes a central rod 14, a braided cable 16, and a coupling 28.

The central rod 14 has a generally cylindrical configuration. The central rod has an upper end 16 and a lower end 18 and an intermediate region 20 there between.

The braided cable 22 has an upper end 24, a lower end 26, an intermediate region between the upper end and the lower end. The braded cable has a cylindrical extension 35 below the lower end.

The coupling 28 has a cylindrical configuration with an upper opening 30 and a lower opening 32 connecting the central rod and the braided cable 22. The upper opening receives the lower end of the central rod. The lower opening receives the upper end of the braided cable.

Next provided is a fastener in the form of a spiral corkscrew 34 having a helical shaped body. The spiral corkscrew has an upper end 36 and a lower end 38. The lower end of the spiral corkscrew has a sharp point 42.

A handle 44 is next provided. The handle has a body cavity with an upper region 46 and a lower region 48. The upper region has a cylindrical extension 50. The lower region has a cylindrical flange 52 and a lateral aperture 54. The lower region further has a left tab 56 and a similarly configured right tab 58. The left tab has a left tab aperture 60. The lateral aperture receives a threaded bolt 62 for coupling the handle to the central rod.

Next, a slide hammer 64 is provided. The slide hammer has a cannulated body positioned along the central rod and the braided cable. The slide hammer has an upper region 66 and a lower region 68. The upper region has an upper cylindrical flange 70 and a lateral aperture 72. The lower region has a lower cylindrical flange 74 and a lower cylindrical extension 76.

A bullnose bushing 78 is next provided. The bullnose bushing is positioned on the lower cylindrical extension of the slide hammer. The bullnose bushing has a generally frusto-conical shape. The bullnose bushing has an upper end 80 and a lower end 82. The lower end has a tapered periphery 84. The bullnose bushing is fabricated of a rigid synthetic polymer chosen from the class of materials including nylon, ABS and other rigid synthetic polymers.

Figure 3:
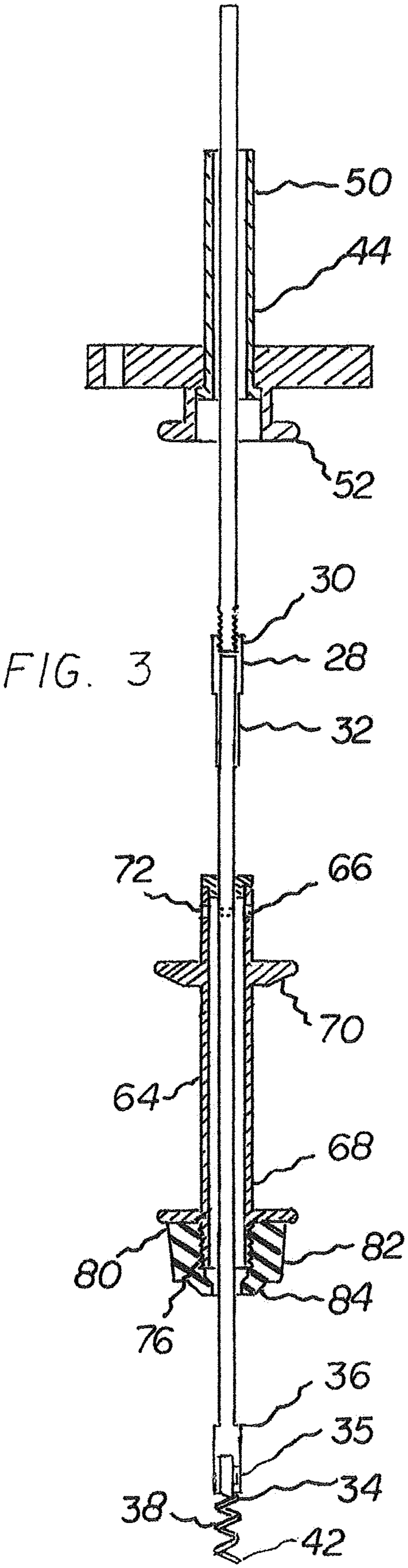
FIG. 3 is a cross sectional view taken along line 3-3 of FIG. 2.
Figure 4:
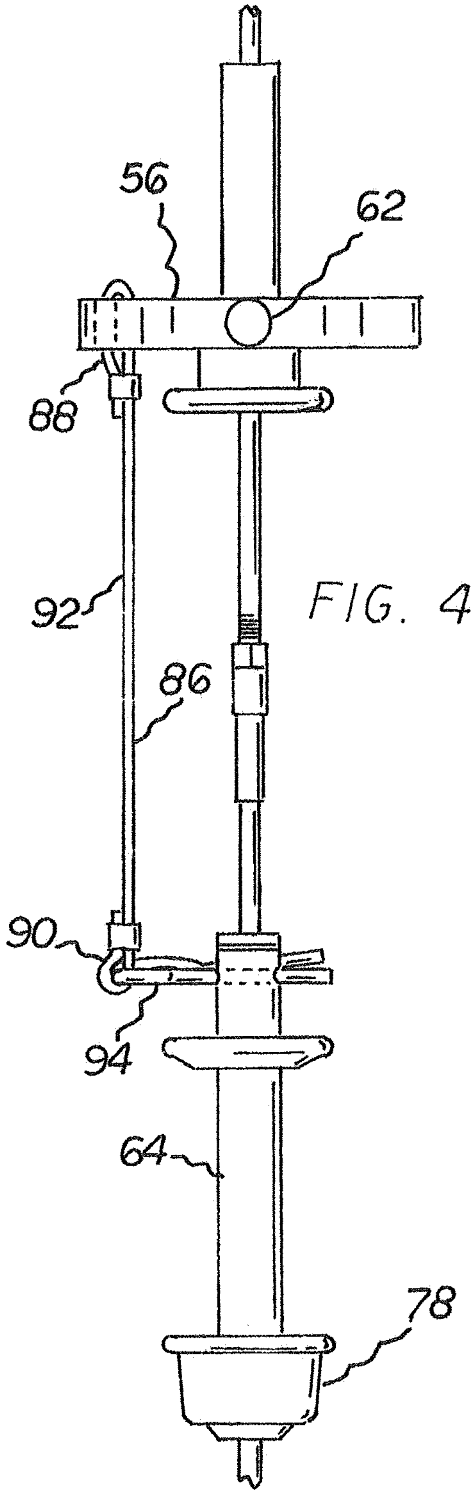
FIG. 4 is a front elevational view showing the system having a safety cable.

The slide hammer 64 is adapted to be grasped by a user and moved upwardly into striking contact with the handle. Such movement occurs with metallic pin 94 removed from the slide hammer and braided cable. Note FIG. 3. Such upward movement of the slide hammer will raise the corkscrew and the packing to achieve the removal of the packing. Note the broken lines in FIG. 1.

Lastly, in the primary embodiment, a safety cable 86 is provided. The safety cable has an upper looped end 88, a lower looped end 90, and an intermediate region 92 there between. The intermediate region has a length. The lower looped end has a metallic pin 94 which is received by the lateral aperture of the upper cylindrical flange. The upper looped end is connected to the left tab aperture.

Figure 5:
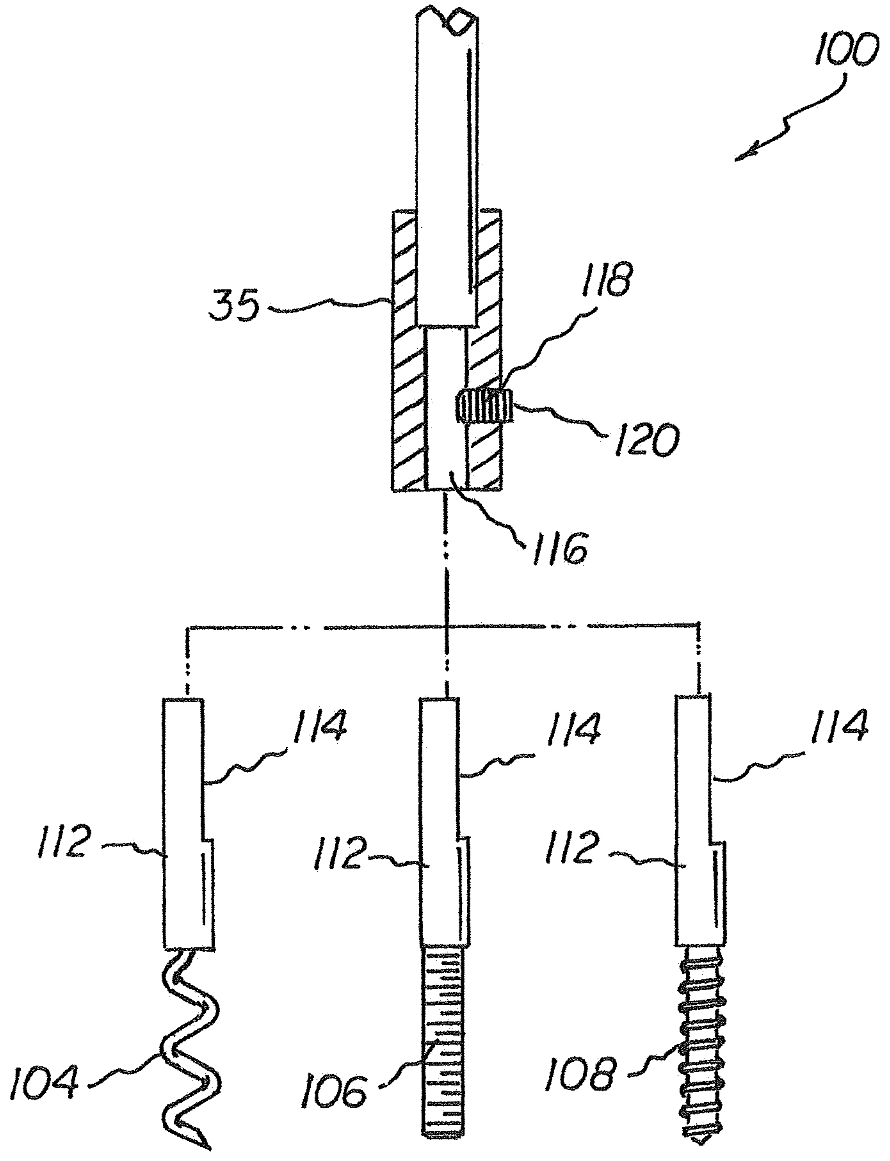
FIG. 5 is an exploded elevational view of the pack jack system of the present invention showing various forms of the fastener.

In the primary embodiment of the invention as illustrated in FIGS. 1-4, a corkscrew constitutes a fastener for coupling the shaft assembly and the clamp. It should be understood, however, that the fastener may take any of a plurality of forms. FIG. 5 illustrates the fastener 100, which is removable and replaceable, as a corkscrew 104, a bolt 106, and a screw 108. The fastener has a shank 112 removably received in a recess 116 formed in the cylindrical extension 35 of the braided cable. A flat 114 is formed on the shank. A threaded recess 118 is provided in the cylindrical extension. A set screw 120 within the threaded recess engages with the flat to preclude unintended rotation.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pack jack system comprising:

a shaft assembly having a central rod, a braided cable, and a coupling between the central rod and the braided cable, the central rod having an upper end and a lower end, the braided cable having an upper end and a lower end, the coupling receiving the lower end of the central rod and the upper end of the braided cable;

a fastener having an upper end and a lower end, the upper end of the fastener having a cylindrical extension for coupling with the lower end of the braided cable;

a handle having an upper region and a lower region, the upper region having a cylindrical extension, the lower region having a cylindrical flange with a left tab and a right tab; and a slide hammer configured to be vertically reciprocable along the shaft assembly, the slide hammer having an upper region with an upper cylindrical flange, the slide hammer having a lower region with a lower cylindrical flange, the lower cylindrical flange having a lower extension.

2. The system as set forth in claim 1 and further including:

a bullnose bushing having a frusto-conical shape, the bullnose bushing being located on the lower extension of the lower cylindrical flange of the slide hammer.

3. The system as set forth in claim 1 and further including:

a safety cable (86) having an upper looped end (88) and a lower looped end (90), the lower looped end secured to the slide hammer, the upper looped end secured to the handle.

4. The system as set forth in claim 1 wherein the fastener is a corkscrew (104).

5. The system as set forth in claim 1 wherein the fastener is a bolt (106).

6. The system as set forth in claim 1 wherein the fastener is a screw (108).

7. A pack jack system (10) for removing gland packing and gasket seals from a variety of pipes, pumps, pump housings and other like systems, the system comprising, in combination:

a shaft assembly including a central rod (14), a braided cable (16), and a coupling (28);

the central rod (14) having a cylindrical configuration, the central rod having an upper end (16) and a lower end (18) and an intermediate region (200) there between;

the braided cable (22) having an upper end (24), a lower end (26), an intermediate region between the upper end of the braided cable and the lower end of the braided cable, and a cylindrical extension (35) below the lower end of the braided cable;

the coupling (28) having a cylindrical configuration with an upper opening (30) and a lower opening (32) connecting the central rod and the braided cable (22), the upper opening receiving the lower end of the central rod and the lower opening receiving the upper end of the braided cable;

a fastener in the form of a spiral corkscrew (34) having a helical shaped body, the spiral corkscrew having an upper end (36) and a lower end (38), the lower end of the spiral corkscrew having a sharp point (42);

a handle (44) having a body cavity with an upper region (46) and a lower region (48), the upper region having a cylindrical extension (50), the lower region having a cylindrical flange (52) and a lateral aperture (54), the lower region further having a left tab (56) and a similarly configured right tab (58), the left tab having a left tab aperture (60), the lateral aperture receiving a threaded bolt (62) for coupling the handle to the central rod;

a slide hammer (64) having a cannulated body positioned along the central rod and the braided cable, the slide hammer having an upper region of the slide hammer (66) and a lower region of the slide hammer (68), the upper region of the slide hammer having an upper cylindrical flange (70) and a lateral aperture (72), the lower region of the slide hammer having a lower cylindrical flange (74) and a lower cylindrical extension (76);

a bullnose bushing (78) positioned on the lower cylindrical extension of the slide hammer, the bullnose bushing having a frusto-conical shape, the bullnose bushing having an upper end (80) and a lower end (82), the lower end of the bullnose bushing having a tapered periphery (84), the bullnose bushing being fabricated of a rigid synthetic polymer chosen from the class of materials including nylon, ABS and other rigid synthetic polymers; and a safety cable (86) having an upper looped end (88) and a lower looped end (90) and an intermediate region (92) there between, the intermediate region of the safety cable having a length, the lower looped end having a metallic pin (94) which is received by the lateral aperture of the upper cylindrical flange, the upper looped end being connected to the left tab aperture.

8. The system (100) as set forth in claim 7 wherein the fastener is removable and replaceable and has a shank (112) removably received in a recess (116) formed in the cylindrical extension (35) of the braided cable, a flat (114) formed on the shank, a threaded recess (118) in the cylindrical extension, and a set screw (120) within the threaded recess engaging with the flat to preclude unintended rotation.

* * * * *